United States Patent [19]
Bouiller et al.

[11] 3,799,476
[45] Mar. 26, 1974

[54] MEANS FOR THE TRANSMISSION OF DRIVE TO AIRCRAFT ACCESSORIES

[75] Inventors: Jean Georges Bouiller, Brunoy; Raymond Jean Maurice Joubert, Savigny-sur-Orge, both of France

[73] Assignee: Societe Nationale D'Etude Et De Construction de Moteurs D'Aviation, Paris, France

[22] Filed: Sept. 6, 1972

[21] Appl. No.: 286,826

[30] Foreign Application Priority Data
Sept. 7, 1971  France .............................. 71.32301

[52] U.S. Cl................ 244/60, 60/39.31, 244/53 R, 244/54
[51] Int. Cl............................................ B64d 35/00
[58] Field of Search............... 244/53 R, 54, 55, 60; 60/39.31; 192/110 S; 64/4; 70/208

[56]  References Cited
UNITED STATES PATENTS

| | | |
|---|---|---|
| 3,181,294 | 5/1965 | Donohue ....................... 60/39.31 X |
| 3,269,118 | 8/1966 | Benedict et al. .................... 60/39.31 |
| 3,302,434 | 2/1967 | Davenbaugh et al. ................. 70/208 |
| 3,382,688 | 5/1968 | Wellekens............................ 70/208 |
| 3,543,536 | 12/1970 | Rekow..................................... 64/4 |
| 2,978,869 | 4/1961 | Hiscock et al. ................ 60/39.31 X |

Primary Examiner—Duane A. Reger
Assistant Examiner—Randolph A. Reese

[57]  ABSTRACT

The engine main casing contains an accessory drive shaft, and the driven shaft for the accessory is contained within an accessory casing having a part-spherical annularly-shaped connecting part coaxial with the driven shaft and engageable slidingly within a cylindrical annularly-shaped connecting part of the engine casing, which is coaxial with the drive shaft, to form therewith a swivel-joint, and the casings further comprise bearing parts for keeping the shafts in alignment, whereupon the shafts are drivingly connected by means of a telescopable shaft section.

7 Claims, 7 Drawing Figures

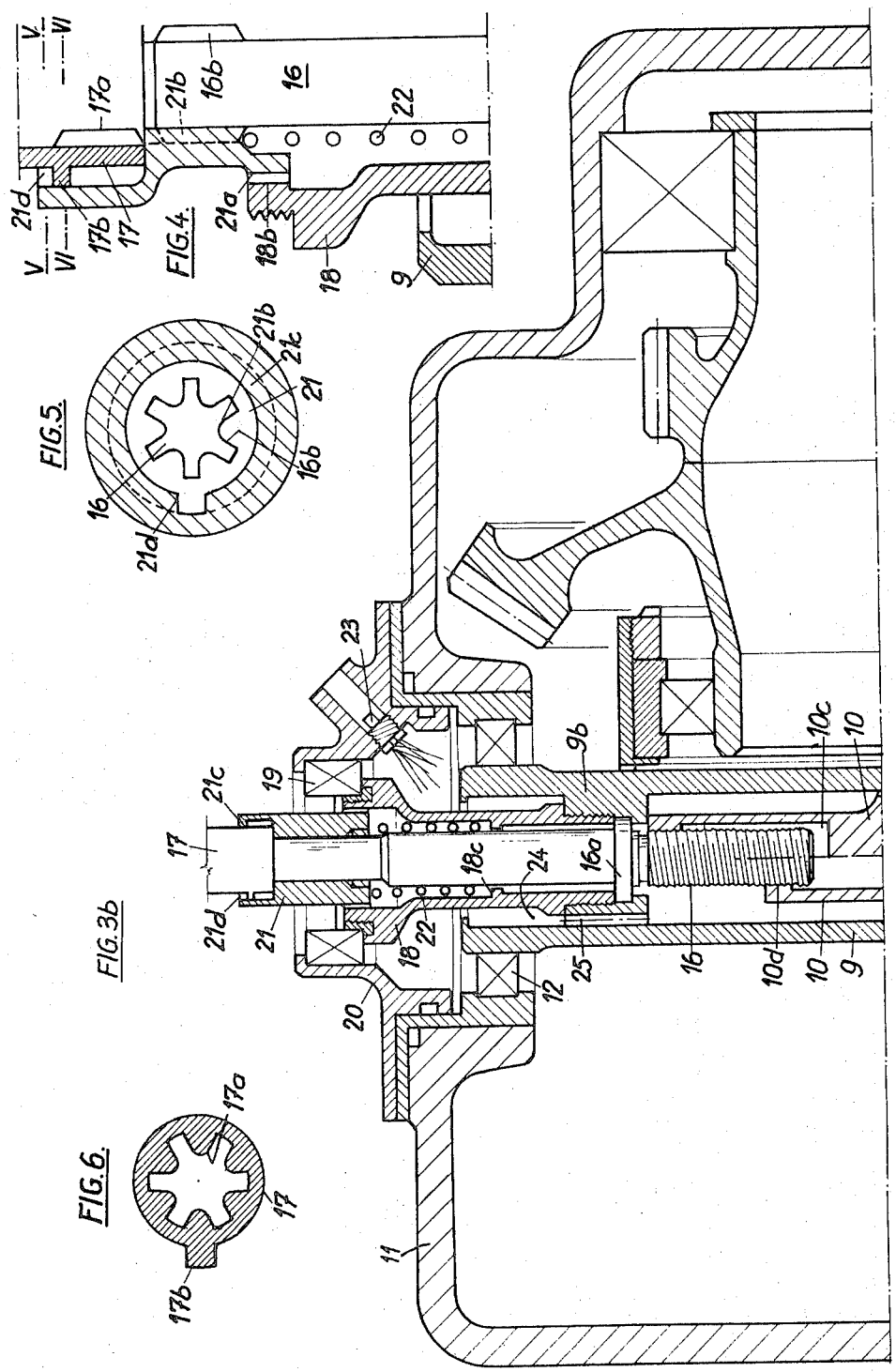

MEANS FOR THE TRANSMISSION OF DRIVE TO AIRCRAFT ACCESSORIES

BACKGROUND OF THE INVENTION

The profitability of aircraft operation depends to a large extent on maintenance costs. To reduce these costs, it would be desirable to be able to remove an engine from the aircraft without having to at least partially dismantle the aircraft's auxiliary equipment, normally referred to as "aircraft accessory", driven by that engine and, in particular, without having to interfere with any of the high pressure couplings of the aircraft's hydraulic circuits.

Aircraft accessories are usually driven by a primary shaft (or drive shaft) which rotates in unison with an engine shaft. In known methods of construction, this engine shaft, which will hereinafter be referred to as the "drive shaft" and which is generally driven transversely to the main shaft, is integral with the primary shaft of the aircraft accessories so that, in order to remove the engine, it is necessary to remove at least the transmission, usually consisting of bevel pinions, which drives the aircraft accessories from the primary shaft.

The present invention is directed towards improvements which enable the engine to be removed without having to dismantle either the transmission or the accessories which it drives and, consequently, to reduce considerably the costs of maintenance.

SUMMARY OF THE INVENTION

The primary shaft is contained in a accessory casing integral with the aircraft and can be coupled to the drive shaft by means of a section of one of the shafts which is able to slide telescopically to effect keyed engagement with the other shaft. The engine casing is equipped with a part which can engage by sliding on or inside a part that is integral with the accessories casing, the said parts being shaped to form a spherical joint centred on the intersection of the axes of two shafts. The two casings are in addition provided with bearings which cooperate to keep these axes aligned. These bearings are bolted together when the engine is installed in the aircraft and means are provided (for example, a screw carried by the accessory casing) to make the telescopic shaft section slide in order to couple or uncouple the drive shaft and the primary shaft.

The telescopic section preferably forms part of the primary shaft to which it remains attached when the engine is removed.

BRIEF DESCRIPTION OF THE DRAWINGS

FIGS. 3a and 3b are still larger scale views of the lower part and the upper part respectively of the structure shown in FIG. 2.

FIG. 4 is a partial view further enlarged, in axial half-section, of the upper extremity of the structure showing the control mechanism for sliding the section of telescopic shaft.

FIG. 5 is a sectional view along the line V—V of FIG. 4 showing this mechanism before the introduction of an operating key.

FIG. 6 shows the operating key seen in section and along the line VI—VI OF FIG. 4.

DESCRIPTION OF THE PREFERRED EMBODIMENT

Figure 1:
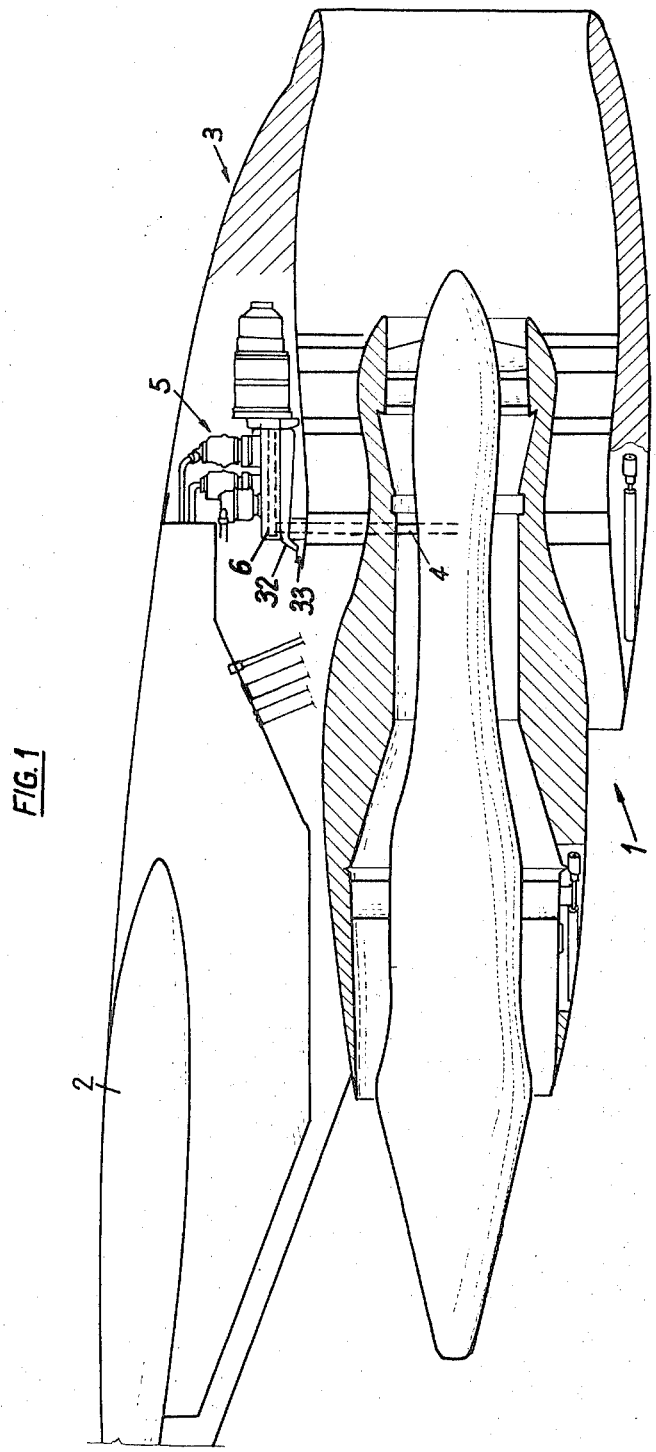
FIG. 1 is a sectional view of an engine installed in a pad beneath an aircraft's wing.

FIG. 1 shows an aeroengine (turbojet) 1 mounted beneath a wing 2 of the aircraft in a pad 3 and driving, by a transverse shaft shown schematically at 4, aircraft accessories 5 whose mounting means 6 is located above the engine and outside it.

Figure 2:
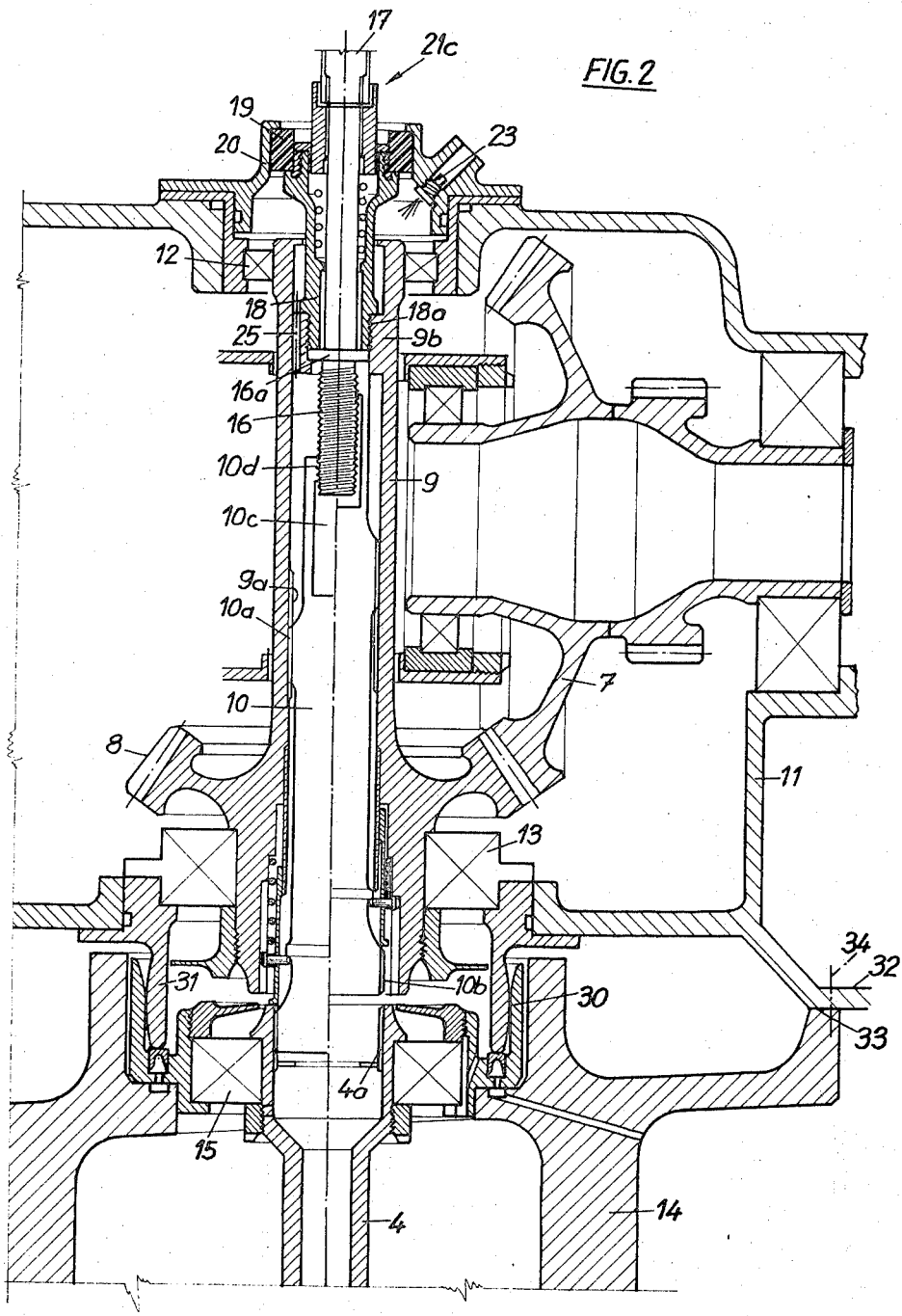
FIG. 2 is a sectional view showing on a larger scale the linkage of the accessory casing with that of the engine and the coupling of the primary shaft with the drive shaft, these shafts being represented as coupled on the left-hand side of the figure and uncoupled on the right-hand side.
Figure 3A:
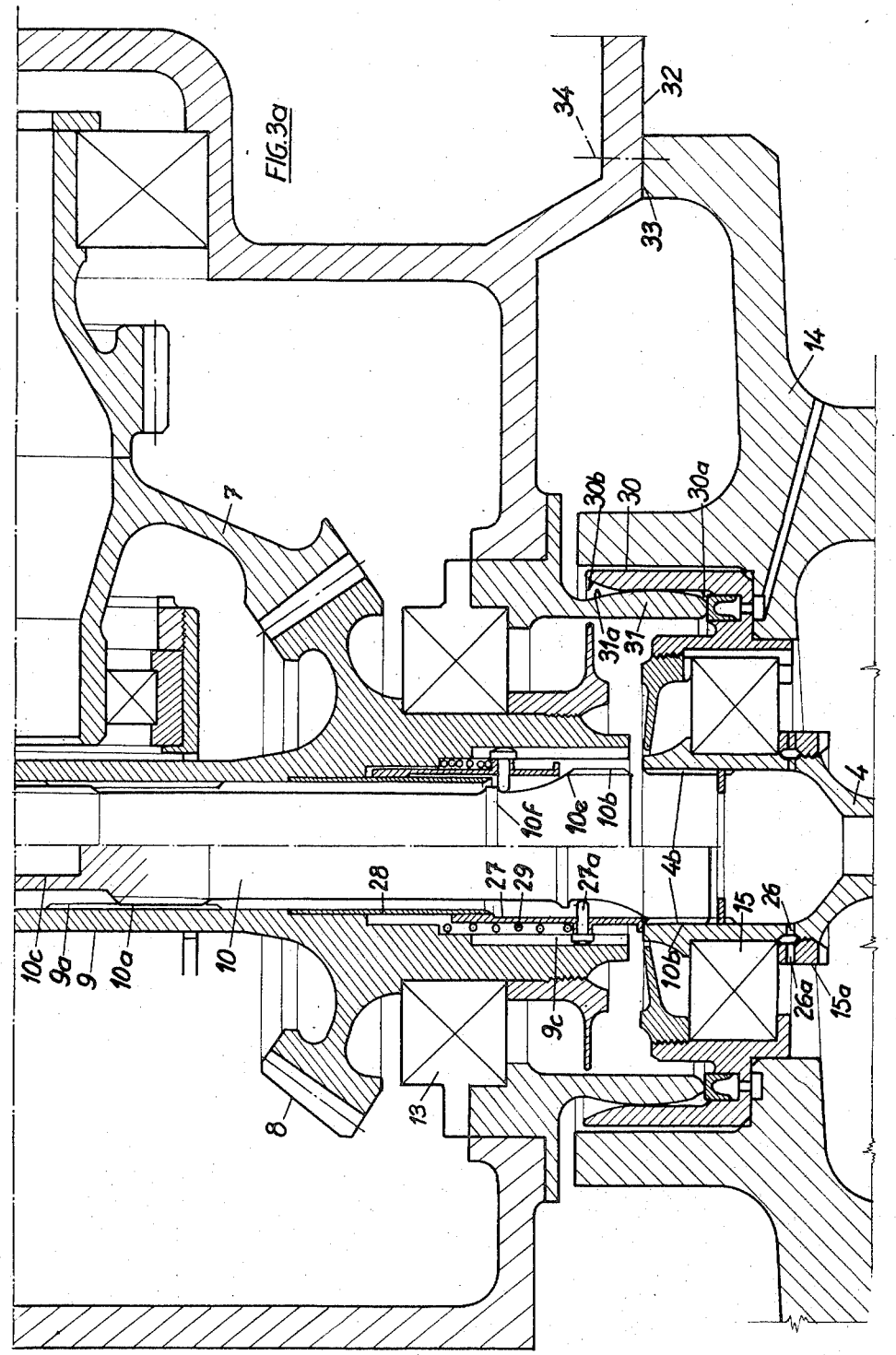

The drive for the aircraft accessories is represented in detail in FIG. 2, 3a and 3b. The aircraft accessories are driven by a bevel pinion 7 which engages with a bevel pinion 8 formed in one piece with a hollow stub shaft 9 joined to the transverse shaft 4 of the engine by a shaft section 10 sliding telescopically in the stub shaft 9. This hollow shaft end 9, integral with pinion 8, forms with the telescopic section 10 the primary shaft of the aircraft accessories; it is contained within an accessory casing 11 and is supported therein by two bearings 12 and 13. Shaft 4, driven from the engine, constitutes the drive shaft of the system; it is contained within the engine casing 14 and one of its bearings 15 can be seen in the drawings.

The shaft section 10 is provided externally with splines 10a arranged so as to slide in splines 9a on the inside of shaft 9. The outer extremity of shaft section 10 is provided with additional splines 10b which can engage with corresponding splines 4a in the hollow end of drive shaft 4 so that, when rotating, the latter drives shaft 9 through the intermediary of the telescopic seion 10.

The inner end of this telescopic section 10 is recessed at 10c and is threaded at 10d. In thread 10d is engaged an operating screw 16 capable of being operated by a screw-driver key 17 to make the section 10 slide telescopically inside the shaft 9 in order either to engage the splines 10b with the splines 4a or to disengage them. The screw 16 is provided with a collar 16a which is held against a projection 9b of the hollow shaft 9 by a sleeve 18 screwed and locked in a thread 18a of this projection. Sleeve 18 is thus rigidly interconnected with the shaft 9; its upper extremity supports a seal 19 to ensure the tightness of a cap 20.

As seen in greater detail in FIG. 3b and 4, the screw 16 is prevented from turning with respect to the hollow shaft 9 and to its sleeve 18, when the key 17 is not in place, by a locking sleeve 21 which is provided externally with splines 21a engaged with splines 18b of the sleeve 18, and internally with splines 21b which slide in splines 16b of screw 16. A return spring 22, resting on a projection 18c of the sleeve 18, pushes the locking sleeve 21 upwardly so that the splines 21a are kept engaged with the splines 18b. The key 17 acts by pressing the locking sleeve 21 against the action of spring 22 so as to disengage the splines 21a from the splines 18b; it is a hollow key provided internally with splines 17a (see FIG. 6) identical with the splines 21b of the locking sleeve 21 and thus able to engage with splines 16b of the screw. For a reason which will be made clear later on, the locking sleeve 21 is provided at its outer end with a re-entrant flange 21c which is indented at 21d (see FIG. 5) opposite to a protruding part of the splines 16b and 21b (i.e., opposite to a "tooth" of spline 16b) while the key 17 is provided with a lug 17b which is able to penetrate into this notch 21d but is opposite to a groove of spline 17a. The arrangement is such that, if the key is engaged in the locking sleeve by making the lug 17b penetrate into notch 21d, the key will need to be turned by half a spline width in order to engage tooth 17a in groove 16b of screw 16.

The splines 9a, 10a and 4a, 10b are lubricated with oil injected by a nozzle 23 into an annular chamber 24 surrounding the sleeve 18 and contained between the bearing 12 and the seal 19. This chamber 24 communicates by a channel 25 formed in projection 9b with the annular space contained between the hollow shaft 9 and the telescopic section 10. Oil thus penetrates into this space, lubricates splines 9a, 10a, then 4a, 10b, arrives at the hollow end of drive shaft 4 and emerges radially through holes 26 made in that shaft 4 and communicating with holes 26a of a nut 15a of the bearing 15. A centrifugal effect is thus obtained which accelerates circulation of the oil and thus lubrication A bush 27, sliding over a sleeve 28 installed in the bore of shaft 9 and supported by a spring 29 on the end of the drive shaft 4, prevents oil leakage between these two shafts and causes the oil to penetrate between the splines 4a and 10b to pass into the cavity of shaft 4 so as to be ejected through holes 26 and 26a. The bush 27 carries pins 27a which slide in longitudinal grooves 9c of this shaft 9, thereby preventing rotation of the casing 27 relative to the shaft 9.

The engine casing 14 is provided with an annular socket-like steel box 30 coaxial with the shaft 4 and having a cylindrical internal surface 30a which is connected with a flared inlet 30b, and the accessories casing 11 is provided with an annular ball-like steel appendage 31 which is coaxial with the shaft 9 and has an external surface 31a which forms part of a sphere having a diameter equal to that of the cylindrical surface 30a. The accessories casing 11 is also provided with three pads 32 which are equally spaced angularly around the axis of shaft 9 and which, when the shaft 9 is aligned with the drive shaft 4 and arranged so that the splines 10b of telescopic section 10 when extended can fully engage with the splines 4a of the shaft 4, rest on an annular bearing surface 33 of the engine casing 14. When the engine is uncoupled from the aircraft accessories, the telescopic section 10 is in the position illustrated on the right of FIGS. 2, 3a and 3b. The section 10 is provided with a bearing surface 10e which engages the bush 27 so that the bush 27 also moves into the position illustrated on the right of these figures.

The engine is installed by hoisting it under the wing 2 (FIG. 1), and sliding box 30 (integral with engine casing 14) on appendage 31 (integral with accessory casing 11 which is fixed permanently to the aircraft). The shapes of surfaces 30a, 30b and 31a allow the box 30 to fit easily on the appendage 31 and to form a spherical joint with it, so that there is no need for the shaft 4 to be aligned with the shaft 9 during this operation. The pads 32 are then brought into contact with the bearing surface 33 and are bolted at 34 into this position. The two shafts 4 and 9 are then aligned perfectly and it is possible to couple them together by operating screw 16 so as to slide the telescopic section 10 into the position illustrated on the left of FIGS. 2, 3a and 3b, i.e., a position in which the splines 10b are fully engaged in the splines 4a.

To operate the screw 16 in this way, the lug 17b of key 17 is inserted in the notch 21d of the locking sleeve 21 and the key is turned as explained above so as to bring the splines 17a exactly into the prolongation of splines 16b of screw 16. By pressing on the key, it is then possible to push the locking sleeve 21, thereby compressing the spring 22, so that the splines 21a of sleeve 21 are completely disengaged from the splines 18b of sleeve 18 which is integral with shaft 9. In this position, the splines 17a of the key are engaged in splines 16b of the screw 16 at the same time as the splines 21b of the locking sleeve. Key 17 (rotation of which effects rotation of the screw 16 and locking sleeve 21) is then turned in the appropriate direction so that the screw 16 disengages from thread 10d, pulling the telescopic section 10 into the coupling position indicated above (represented on the left of FIGS. 2, 3a and 3b). In this position, the bush 27 is again applied to the end of shaft 4 by the spring 29. If the spring should fail, a bearing surface 10f of the telescopic section 10 will press on pins 27a so as to push the bush 27 downwardly. Splines 10b and 4a have frontal gaps facilitating introduction of the telescopic section 10 into the hollow end of shaft 4.

When the pressure on key 17 is removed, the locking sleeve 21 is pushed up again by the spring 22, so that the splines 21a of the locking sleeve 21 again engage in the splines 18b of sleeve 18, thus preventing any inadvertent rotation of the screw 16 with respect to the shaft 9 which would risk uncoupling the latter from the drive shaft 4. The purpose of the lug 17b and the notch 21d is to prevent the key 17 from being removed if the sleeve 21 has not returned to the locking position shown in FIG. 4. It will be understood that, if the splines 21a are not completely engaged in the splines 18b, collar 21c will be located lower down than is shown in FIG. 3a, so that it will be impossible to pull the key 17 up high enough to disengage its splines 17a from the splines 16b of the screw in order to be able to turn the key 17 to bring its lug 17b opposite the notch 21d.

To remove the engine, the key 17 is engaged as has already been described, but it is turned in the opposite direction so that the screw 16, entering the thread 10d, can cause the telescopic section 10 to slide towards the interior of shaft 9 so as to disengage the splines 10b from the splines 4a. When the engine has been uncoupled from the aircraft accessories in this way, its removal presents no difficulty.

What is claimed is:

1. An aircraft engine and accessory assembly comprising an engine casing containing an accessory drive shaft and having an annular connecting part coaxial with the axis of the drive shaft, an accessory casing containing a driven shaft for the accessory and having an annular connecting part coaxial with the axis of the driven shaft, said connecting parts comprising a socket-like member and a ball-like member engageable slidably within the socket-like member to form therewith a slidable swivel-joint centered on a point of intersection of said axes, bearing parts on said engine and accessory casings, adapted to engage each other in a position of said casings wherein said axes are in mutual alignment, means for securing said casing together in said position, a telescopically slidable shaft section having keying means adapted to engage keying means of said drive shaft and driven shaft, and means for sliding said shaft section to couple drivingly and uncouple said shafts in said position.

2. An assembly as claimed in claim 1 wherein the ball-like member comprises a part-spherical outer surface, and the socket-like member comprises a cylindrical inner surface having an outwardly flared section.

3. An assembly as claimed in claim 1 wherein the driven shaft is a hollow shaft having the keying means of the driven shaft extending internally of the hollow shaft, the shaft section is telescopable within said hollow shaft with keying means being slidable along said keying means of the hollow shaft, and said means for sliding said shaft section comprise an operating screw received rotatably within said hollow shaft and having threaded engagement with said shaft section.

4. An assembly as claimed in claim 3, comprising a locking sleeve slidable in a gap between the hollow shaft and the operating screw and having inner and outer splined portions, spring means urging the locking sleeve to a locking position wherein said inner and outer splined portions engage respective splined portions of the operating screw and hollow shaft, and a screw-driver key for engaging a bearing surface of the locking sleeve to impart to the locking sleeve a sliding movement away from said locking position, and for turning the operating screw.

5. An assembly as claimed in claim 4, wherein said outer splined portion is slidable along the splined portion of the operating screw, and the screw-driver key has a splined portion adapted to engage said splined portion of the operating screw in said sliding movement.

6. An assembly as claimed in claim 5, wherein the locking sleeve has an inwardly projecting flange comprising a notch which can admit a lug of the screw-driver key to enable the screw-driver key to engage said bearing surface of the locking sleeve, the notch and the lug being so located, circumferentially of the locking sleeve and the screw-driver key respectively, that it is necessary to turn the screw-driver key after passing the lug through the notch, to engage said splined portion of the screw-driver key in said splined portion of the operating screw, and the axial distance between said flange and said bearing surface being such that the splined portion of the screw-driver key engages the splined portion of the operating screw so long as said outer splined portion does not engage the splined portion of the hollow shaft.

7. An assembly as claimed in claim 3, comprising a collar on the operating screw, an inwardly projecting portion of the hollow shaft for rotatably mounting said collar, means for feeding lubricating oil within the hollow shaft at the free end thereof remote from the drive shaft, a passage for the lubricating oil through said inwardly projecting portion, a bush sealingly slidable telescopically within the hollow shaft and spring urged against a hollow end portion of the drive shaft, said hollow portion having an internally splined tubular wall providing said keying means of the drive shaft, a port leading substantially radially into the accessory casing through said tubular wall for producing a centrifugal effect to accelerate circulation of the lubricating oil through said passage and said keying means, and an abutting surface of the telescopically slidable shaft section for engaging said bush to retract the same within the hollow shaft together with said shaft section.

* * * * *